United States Patent
Huang et al.

(10) Patent No.: US 11,422,567 B2
(45) Date of Patent: Aug. 23, 2022

(54) ROBOT RECHARGING LOCALIZATION METHOD AND ROBOT USING THE SAME

(71) Applicant: UBTECH ROBOTICS CORP LTD, Shenzhen (CN)

(72) Inventors: Xiangbin Huang, Shenzhen (CN); Gaobo Huang, Shenzhen (CN); Pinjun Fu, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 355 days.

(21) Appl. No.: 16/718,212

(22) Filed: Dec. 18, 2019

(65) Prior Publication Data

US 2021/0055739 A1 Feb. 25, 2021

(30) Foreign Application Priority Data

Aug. 23, 2019 (CN) .......................... 201910786056.7

(51) Int. Cl.
*G05D 1/02* (2020.01)
*G01S 13/88* (2006.01)
(Continued)

(52) U.S. Cl.
CPC .......... *G05D 1/0225* (2013.01); *B25J 9/1684* (2013.01); *B25J 9/1694* (2013.01);
(Continued)

(58) Field of Classification Search
CPC .... G05D 1/0225; G05D 1/021; G05D 1/0257; G01S 13/88; G01S 7/41;
(Continued)

(56) References Cited

U.S. PATENT DOCUMENTS 10,761,539 B2 * 9/2020 Moore ................. G05D 1/0236
2016/0271795 A1 * 9/2016 Vicenti ................ G05D 1/0274
(Continued)

FOREIGN PATENT DOCUMENTS

| EP | 3460395 A1 | 3/2019 |
|----|------------|--------|
| JP | 2011-2880 A | 1/2011 |
| JP | 2017-49933 A | 3/2017 |

*Primary Examiner* — Erin F Heard
*Assistant Examiner* — Ismaaeel A. Siddiquee

(57) ABSTRACT

The present disclosure provides a robot recharging localization method including: calculating a directional angle of a first identification line based on identification points near a radar zero point of the first recognition line collected by a radar of the robot; determining a sequence of the identification points in an identification area according to the calculated directional angle of the first identification line, and finding two endpoints of the sequence of the identification points; determining dividing point(s) in the sequence of the identification points; fitting the sequence of the identification points to obtain a linear equation of the first identification line with respect to a coordinate system of a mobile robot; and determining a central positional coordinate of the first identification line based on the dividing point(s) and a linear equation, and determining a relative position of the robot based on the central positional coordinate and the linear equation.

20 Claims, 11 Drawing Sheets

(51) Int. Cl.
  *B25J 11/00* (2006.01)
  *B25J 9/16* (2006.01)
  *B25J 19/00* (2006.01)
  *G01S 13/42* (2006.01)
  *G01S 7/48* (2006.01)
  *G01S 17/42* (2006.01)
  *H02J 7/00* (2006.01)
  *G01S 17/88* (2006.01)
  *B25J 19/02* (2006.01)
  *G01S 7/41* (2006.01)
  *G01S 13/931* (2020.01)

(52) U.S. Cl.
  CPC ............ *B25J 11/008* (2013.01); *B25J 19/00* (2013.01); *B25J 19/005* (2013.01); *B25J 19/02* (2013.01); *G01S 7/4808* (2013.01); *G01S 13/42* (2013.01); *G01S 13/88* (2013.01); *G01S 13/881* (2013.01); *G01S 17/42* (2013.01); *G01S 17/88* (2013.01); *G05D 1/021* (2013.01); *G05D 1/0257* (2013.01); *H02J 7/0013* (2013.01); *B25J 9/1664* (2013.01); *G01S 7/41* (2013.01); *G01S 2013/9323* (2020.01)

(58) Field of Classification Search
  CPC ........... G01S 2013/9323; G01S 7/4808; G01S 13/42; G01S 13/881; G01S 17/88; G01S 17/42; B25J 19/00; B25J 19/02; B25J 9/1664; B25J 9/1684; B25J 9/1694; B25J 11/008; B25J 19/005; H02J 7/0013
  See application file for complete search history.

(56) References Cited

U.S. PATENT DOCUMENTS

| | | |
|---|---|---|
| 2018/0149753 A1 | 5/2018 | Shin et al. |
| 2018/0246518 A1 | 8/2018 | Vogel et al. |
| 2019/0120633 A1* | 4/2019 | Afrouzi ................ G05D 1/0219 |
| 2020/0116501 A1* | 4/2020 | Wu ........................ G01C 21/16 |

\* cited by examiner

ROBOT RECHARGING LOCALIZATION METHOD AND ROBOT USING THE SAME

CROSS REFERENCE TO RELATED APPLICATIONS

This application claims priority to Chinese Patent Application No. 201910786056.7, filed Aug. 23, 2019, which is hereby incorporated by reference herein as if set forth in its entirety.

BACKGROUND

1. Technical Field

The present disclosure relates to robot technology, and particularly to a robot recharging localization method and a robot using the same.

2. Description of Related Art

In order to improve the intelligence of the usage of robots, many robots such as service robots or inspection robots are provided with an automatic recharge function. When the robot completes the tasks, or the robot's power is below a certain value, the robot will automatically find a charging station for charging. That is, the robot searches for the charging station around the robot, automatically moves to the front of the charging station, and docks to the charging station to connect to the power source.

In order to move the robot to the charging station reliably, the robot needs to be localized. The current localization methods include infrared localization, visual localization, and the like, which are easily interfered by ambient light during the localization and may affect the localization accuracy when recharging the robot, and is not conducive to accurately and reliably completing the automatic recharge of the robot.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be understood that, the drawings in the following description merely show some embodiments of the present disclosure. For those skilled in the art, other drawings can be obtained according to the drawings without creative efforts.

DETAILED DESCRIPTION

In the following descriptions, for purposes of explanation instead of limitation, specific details such as particular system architecture and technique are set forth in order to provide a thorough understanding of embodiments of the present disclosure. However, it will be apparent to those skilled in the art that the present disclosure may be implemented in other embodiments that are less specific of these details. In other instances, detailed descriptions of well-known systems, devices, circuits, and methods are omitted so as not to obscure the description of the present disclosure with unnecessary detail.

For the purpose of describing the technical solutions of the present disclosure, the following describes through specific embodiments.

Figure 1A:
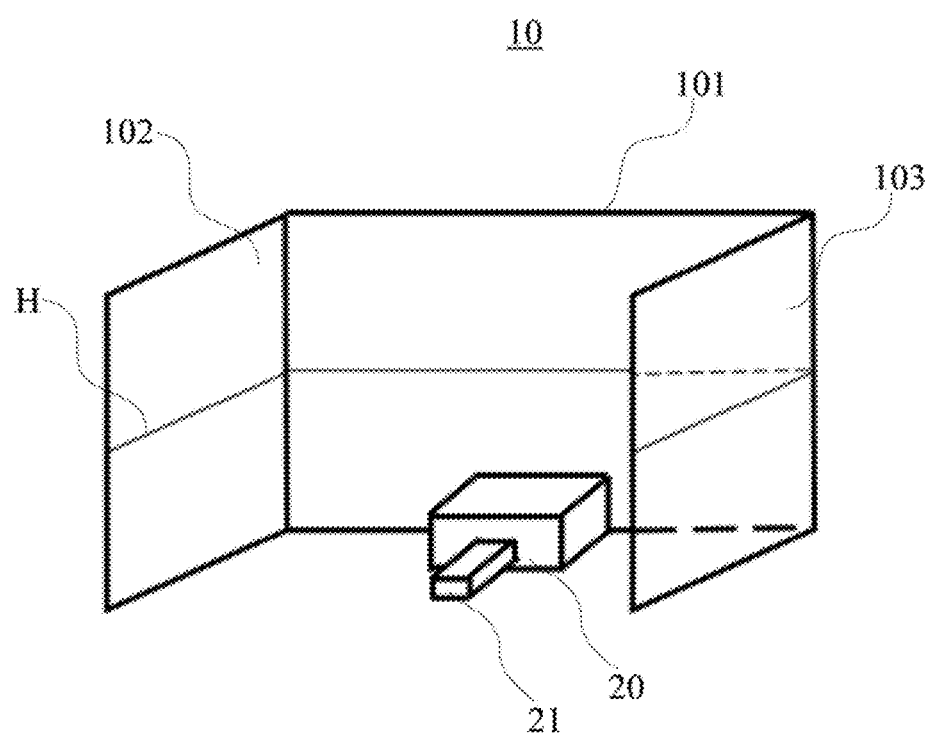
FIG. 1A is a 3D schematic diagram of an example of the shape of a charging identification area according to an embodiment of the present disclosure.
Figure 1B:
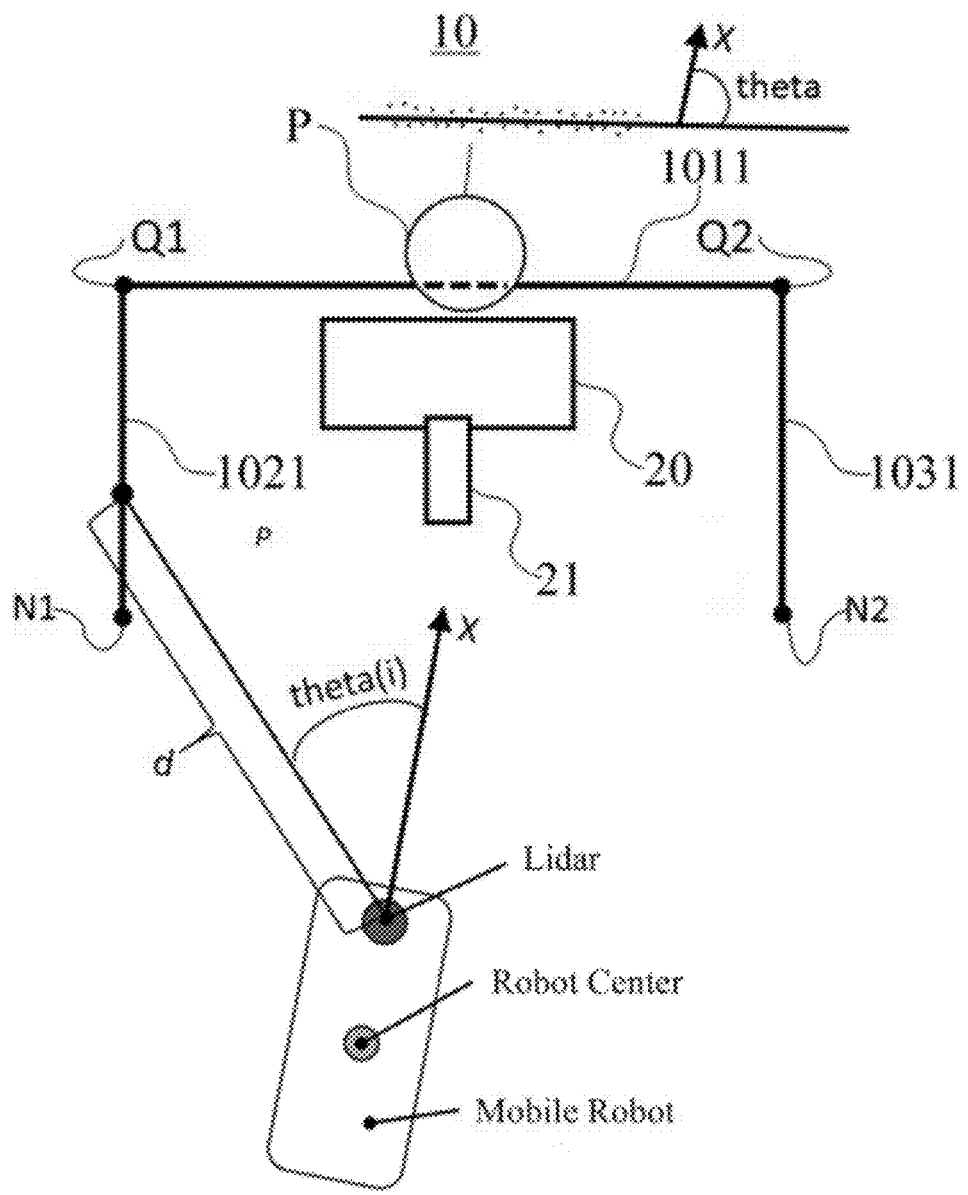
FIG. 1B is a schematic diagram of an example of the shape of a horizontal section of the charging identification area of FIG. 1A.
Figure 2:
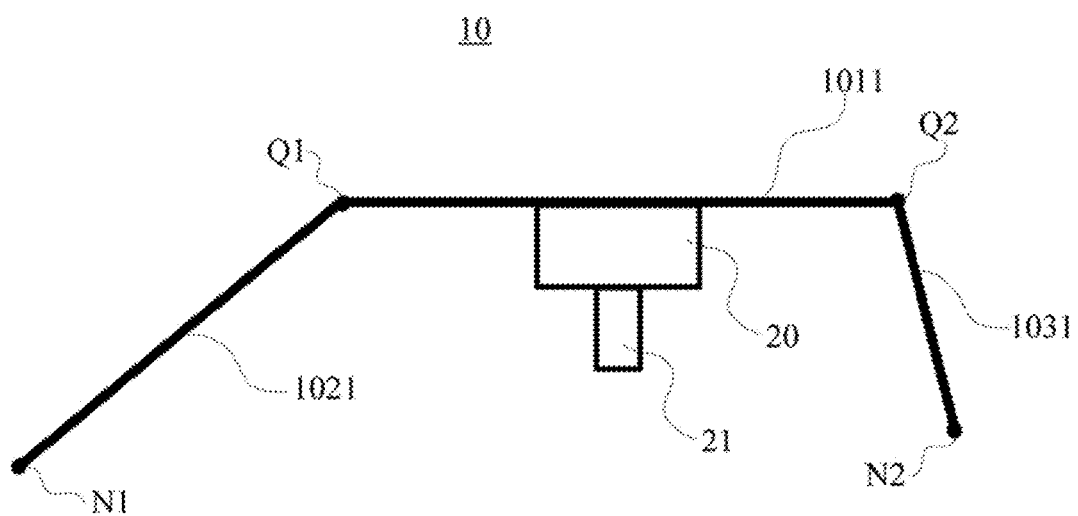
FIG. 2 is a schematic diagram of another example of the shape of a horizontal section of a charging identification area according to an embodiment of the present disclosure.

FIG. 1A is a 3D schematic diagram of an example of the shape of a charging identification area according to an embodiment of the present disclosure; and FIG. 1B is a schematic diagram of an example of the shape of a horizontal section of the charging identification area of FIG. 1A. As shown in FIG. 1A and FIG. 1B, a charging identification area 10 is defined by a first identification surface 11 as well as a second identification surface 12 and a third identification surface 13 that both extend from the first identification surface 11 in a same direction. The identification area 10 is provided with a charging station 20 having a charging interface 21 for a robot to charge. The first identification surface 11, the second identification surface 12 and the third identification surface 13 intersect a horizontal section H of the identification area 10 on a first identification line 1011, a second identification line 1021 and a third identification line 1031, respectively. In which, the second identification line 1021 and the third identification line 1031 can respectively have a vertical relationship with respect to the first identification line 1011, or can respectively have a non-vertical relationship which has an included angle greater than 90 degrees with respect to the first identification line 1011. For example, as shown in FIG. 2, the straight angle between the first identification line 1011, the second identification line 1021 and the third identification line 1031 is greater than 90 degrees. In other embodiments, the horizontal section H of the identification area 10 can be an unhorizontal section.

Figure 3:
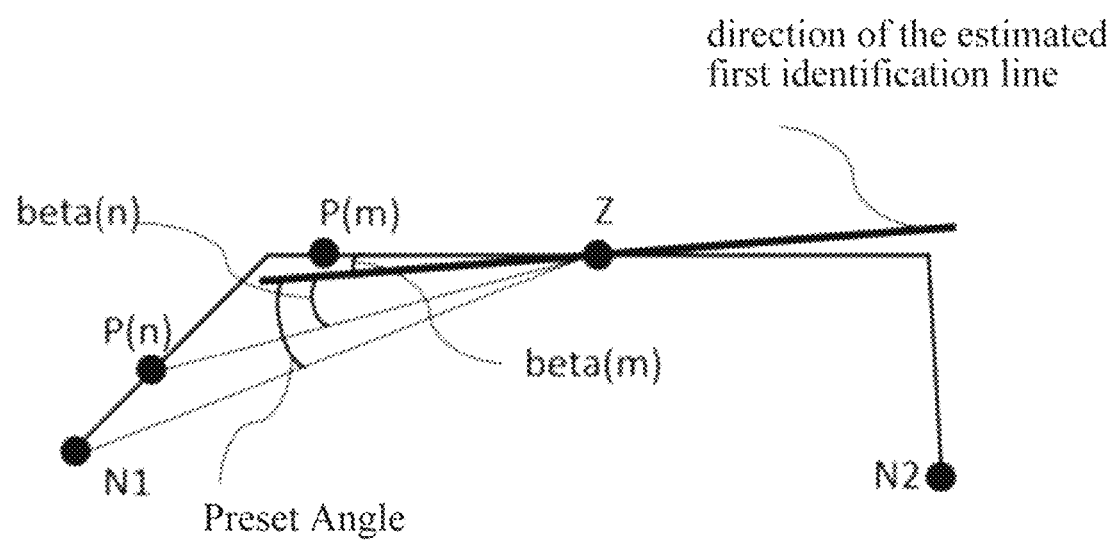
FIG. 3 is a schematic diagram of an example of finding endpoints of a charging identification area according to an embodiment of the present disclosure.

FIG. 3 is a schematic diagram of an example of finding endpoints of a charging identification area according to an embodiment of the present disclosure. As shown in FIG. 3, in this embodiment, a mobile robot such as a patrolling robot is installed with a detecting radar. In this embodiment, the detecting radar is a lidar. The detecting radar can be installed directly in front of the robot, and a polar coordinate system of the radar which has a direction directly in front of the detecting radar as the X-axis and the radar as the center point can be created, where the position of the lidar cannot overlap with the center of the robot. The detecting radar can be centered on the X-axis to scan a predetermined scanning range. For example, if the SICK571 lidar is used, the scanning range is ±270 degrees, the angular resolution is 0.33 degrees, and each data frame can have 811 distance values; the array d[i] indicates the distance of the i-th point (where i=0-810), and theta(i) indicates the directional angle of the i-th point, then d[0] can indicate the distance of −270 degrees, d[810] can indicate the distance of +270 degrees, d[405] can represent the distance of 0 degrees. When the polar coordinate system of the radar is converted into a Cartesian coordinate system, the calculation of the coordinate of the identification point of the identification area can be expressed through the following equations:

point_$x(i)=d(i)*\cos(\text{theta}(i))$; and point_$y(i)=d(i)*\sin(\text{theta}(i))$.

Figure 4:
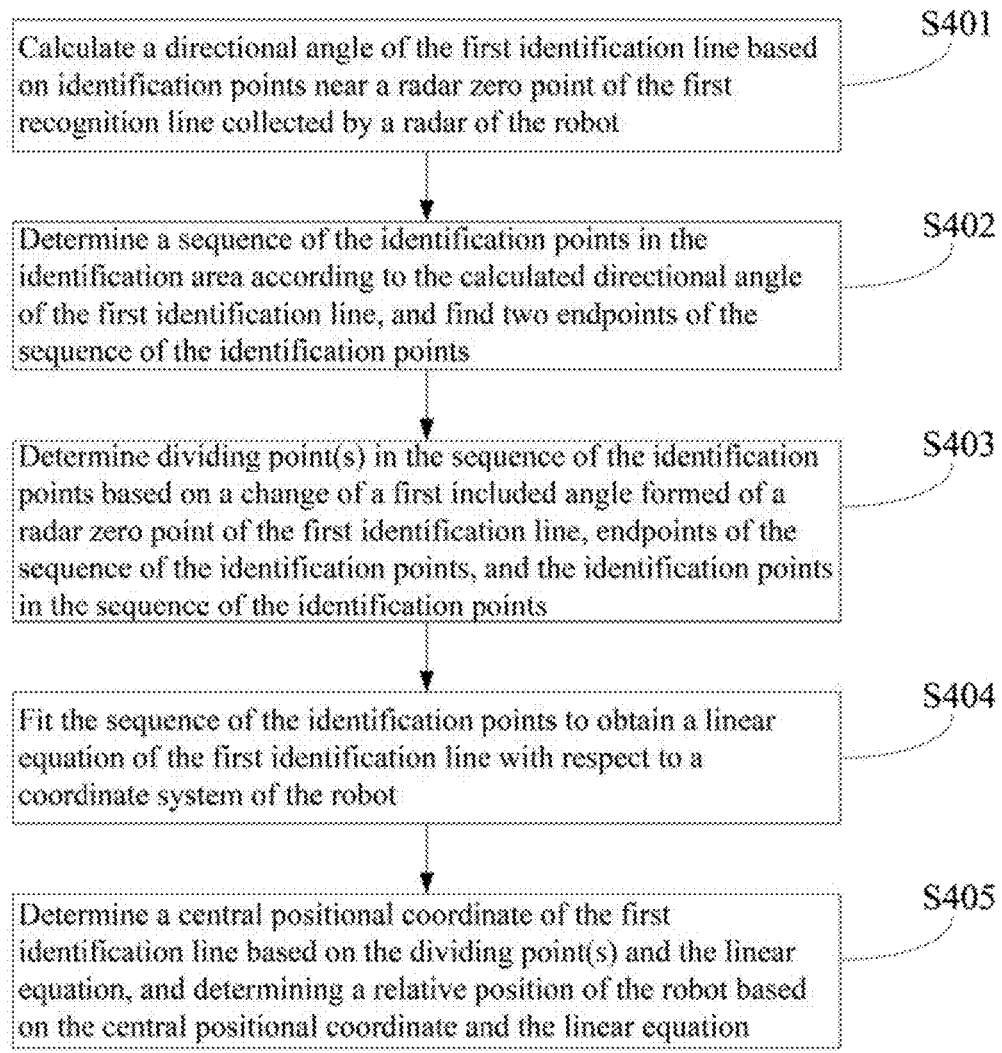
FIG. 4 is a flow chart of a robot recharging localization method according to an embodiment of the present disclosure.
Figure 9:
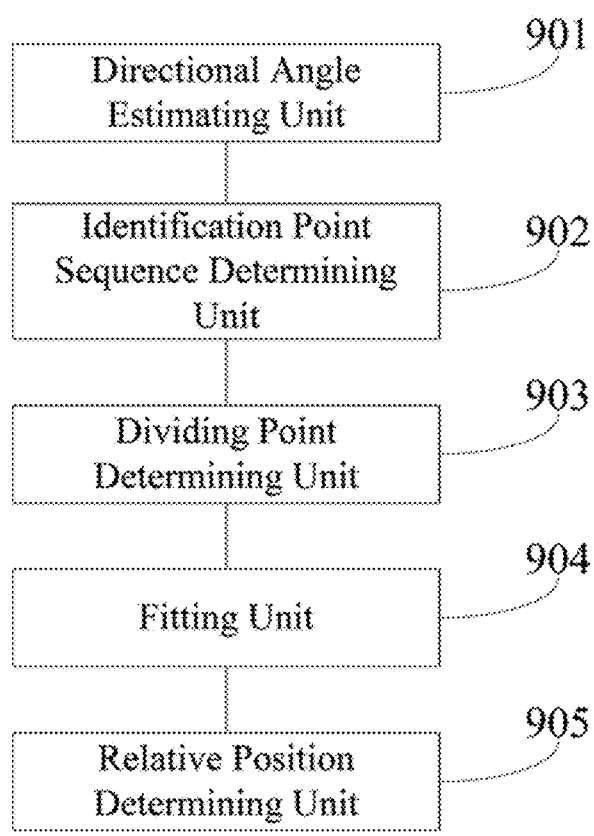
FIG. 9 is a schematic block diagram of an embodiment of a robot recharging localization apparatus according to the present disclosure.
Figure 10:
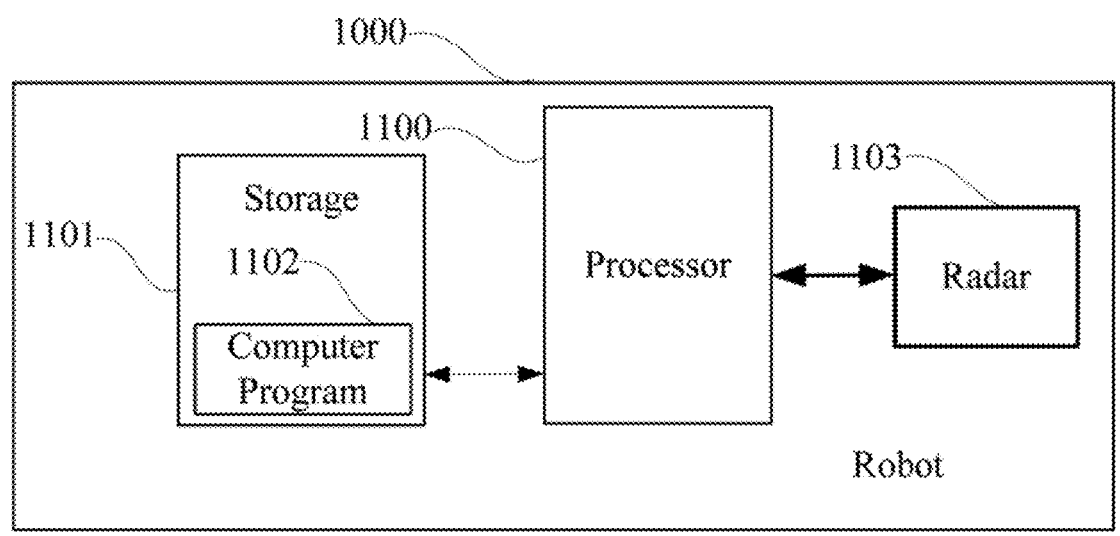
FIG. 10 is a schematic block diagram of an embodiment of a mobile robot according to the present disclosure.

FIG. 4 is a flow chart of a robot recharging localization method according to an embodiment of the present disclosure. In this embodiment, a localization method for a robot to recharge is provided. The method is a computer-implemented method executable for a processor, which may be implemented through and applied to a robot recharging localization apparatus as shown in FIG. 9 or a robot as shown in FIG. 10. As shown in FIG. 4, the method includes the following steps.

S401: calculating a directional angle of the first identification line based on identification points near a radar zero point of the first recognition line collected by a radar of the robot.

Figure 5:
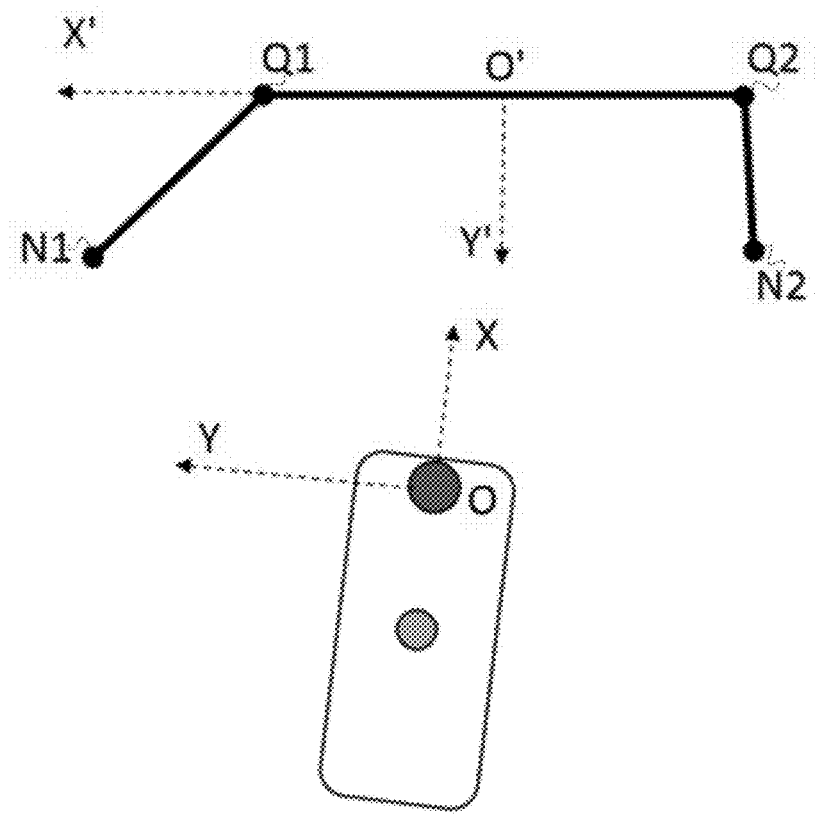
FIG. 5 is a schematic diagram of a coordinate system of a radar of a robot and a coordinate system of a charging station according to an embodiment of the present disclosure.
Figure 6:
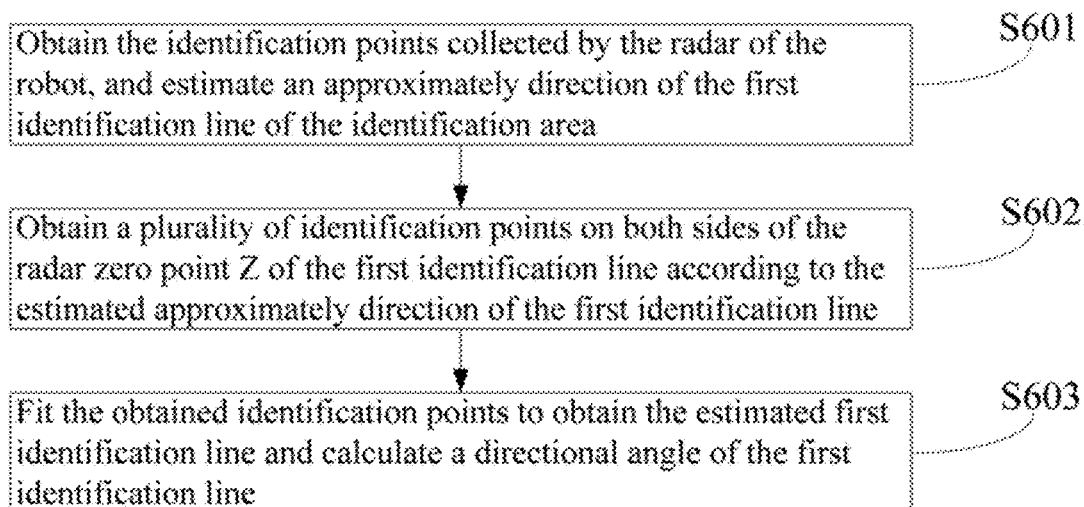
FIG. 6 is a flow chart of an example of calculating a directional angle of a first identification line according to an embodiment of the present disclosure.

In this embodiment, a general orientation of the charging station can be determined in advance. According to the general orientation, it can make a detecting radar of the robot to direct to the first identification line of the charging station. When detecting the identification points P (see FIG. 1B) through the detecting radar disposed on the robot, the distance and the orientation between the identification point and the detecting radar of the robot can be detected, and the position of the identification points P can be determined in a coordinate system of the radar of the robot (i.e., the coordinate system of the robot). FIG. 5 is a schematic diagram of a coordinate system of a radar of a robot and a coordinate system of a charging station according to an embodiment of the present disclosure. As shown in FIG. 5, the coordinate system of the radar of the robot (in short, the coordinate system of the robot) is XOY, and the coordinate system of the charging station is X'O'Y'. The directional angle theta of the first identification line is an included angle of the first identification line and the axis X in the coordinate system XOY of the robot (FIG. 3 and FIG. 5). FIG. 6 is a flow chart of an example of calculating a directional angle of a first identification line according to an embodiment of the present disclosure. As shown in FIG. 6, the step of calculating the directional angle of the first identification line of the identification area includes:

S601: obtaining the identification points collected by the radar of the robot, and estimating an approximately direction of the first identification line of the identification area.

The plurality of identification points detected through the detecting radar can form the identification area of the robot. In one embodiment, since the first identification line is positioned at a central part of the identification area, a direction of the body in the central part can be taken as a blur direction of the first identification line.

S602: obtaining a plurality of identification points on both sides of the radar zero point Z of the first identification line according to the estimated approximately direction of the first identification line.

The plurality of identification points (e.g., 30 identification points) on the both sides of the radar zero point Z is obtained according to the estimated approximately direction of the first identification line. In which, the radar zero point Z refers to a point on the first identification line corresponding to a 0-degree direction of the radar during the ranging of the lidar.

S603: fitting the obtained identification points to obtain the estimated first identification line and calculating a directional angle of the first identification line.

As shown in FIG. B, the estimated directional angle theta of the first identification line is an included angle between the first identification line and the coordinate axis X in the radar coordinate system XOY.

S402: determining a sequence of the identification points in the identification area according to the calculated directional angle of the first identification line, and finding two endpoints of the sequence of the identification points.

Figure 7:
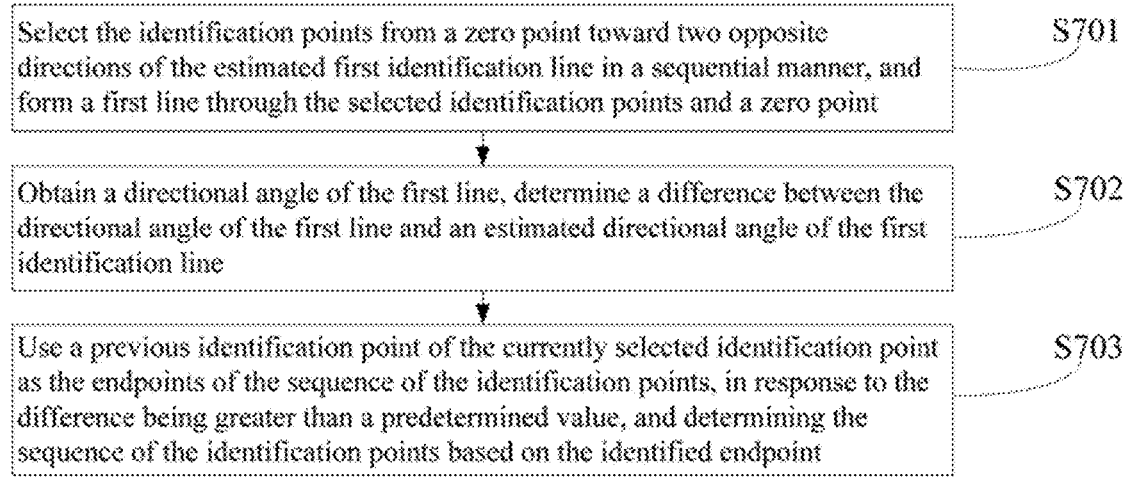
FIG. 7 is a flow chart of an example of determining a sequence of identification points according to an embodiment of the present disclosure.

When the robot obtains multiple identification points, there may include impurity identification points in the non-identification area or the identification points away from the first identification line. FIG. 7 is a flow chart of an example of determining a sequence of identification points according to an embodiment of the present disclosure. As shown in FIG. 7, the method is for effectively filtering the identification points, which includes the following steps.

S701: selecting the identification points P from a zero point Z toward two opposite directions of the estimated first identification line in a sequential manner, and forming a first line through the selected identification points P and a zero point Z.

S702: obtaining a directional angle of the first line, determining a difference between the directional angle of the first line and an estimated directional angle of the first identification line.

S703: using a previous identification point of the currently selected identification point as the endpoints of the sequence of the identification points, in response to the difference being greater than a predetermined value, and determining the sequence of the identification points based on the identified endpoint.

In this embodiment, the zero point Z is used as a midpoint, and an included angle beta between a straight line formed of the current point P and the zero point Z and the estimated first identification line is calculated from two opposite directions of the estimated first identification line in a round robin manner. As shown in FIG. 3, there are two included angles beta (m) and beta (n) corresponding to the two points P (m) and p (n), respectively. When the included angle beta is larger than a preset angle (for example, 30°), the previously found point is marked as N1 or N2. In such a manner, all points on the three identification lines 1011, 1021, and 1031 are determined.

S403 determining dividing points Q1 and Q2 in the sequence of the identification points based on a change of a first included angle formed of a radar zero point of the first identification line, endpoints of the sequence of the identification points, and the identification points in the sequence of the identification points:

When determining the dividing points Q1 and Q2 (see FIG. 5), it can identify one of the endpoints of the sequence of the identification points, the zero-degree point of the radar, and a central identification point between the zero-degree point and the endpoint to form a first included angle gama (see FIG. 8) with the central identification point as a vertex, and determine the central identification point corresponding to the smallest first included angle as the division point. In other embodiment, the identification point corresponding to the maximum included angle formed by taking the endpoint as a vertex can also be taken as the division point.

Figure 8:
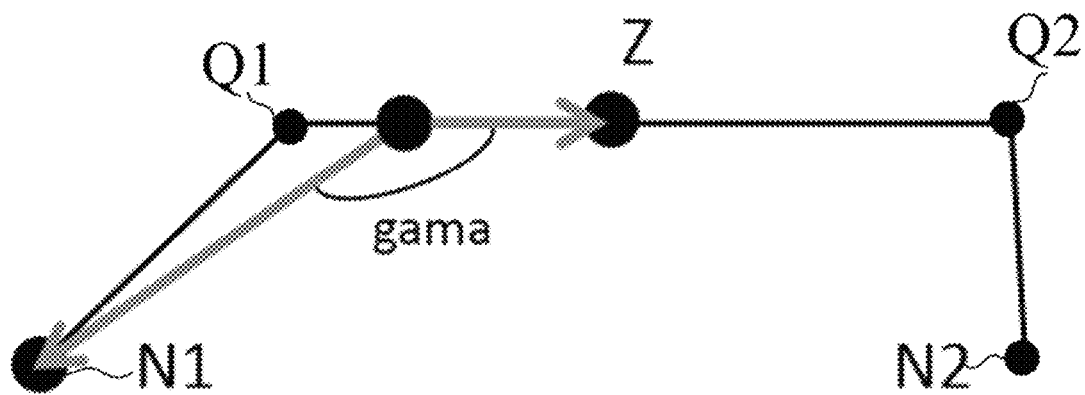
FIG. 8 is a schematic diagram of an example of determining dividing points based on a change of an included angle.

FIG. 8 is a schematic diagram of an example of determining dividing points based on a change of an included angle. As shown in FIG. 8, it is assumed that the zero-degree point Z of the radar is located in the first identification line, N1 and N2 are the endpoints of the two ends of the identification area, and a central identification point is arbitrarily selected from a central area formed by the endpoints N1 and Z, which forms the first angle, that is, the angle gama. In the smallest angle gama, the corresponding central identification point is a division point Q1 or Q2 of the first identification line and a side line.

S404: fitting the sequence of the identification points to obtain a linear equation of the first identification line with respect to a coordinate system of the robot.

Assuming that the linear equation of the first identification line is $y_i=a_ix_i+b_i$, since the divided first identification line includes a plurality of identification points, the linear equation corresponding to the first identification line can be obtained by fitting through a fitting method such as least squares.

S405: determining a central positional coordinate of the first identification line based on the dividing point(s) and the linear equation, and determining a relative position of the robot based on the central positional coordinate and the linear equation.

According to the fitted linear equation and the determined dividing point(s), the midpoint in the linear equation can be obtained, that is, after calculating an average value of the coordinate of the dividing point(s), the calculated average value is fitted to the linear equation so as to obtain the coordinate of the midpoint of the first identification line. By combining the line equation, the second angle ang of the first identification line and the X-axis of the coordinate system of the radar can be determined, and a conversion matrix for converting the coordinate in the coordinate system of the radar into the coordinate of the coordinate system of the charging station can be obtained based on the determined second angle and the coordinate of the midpoint, where the conversion matrix can be:

$$A = \begin{bmatrix} \cos(ang) & \sin(ang) & -x_{O'}\cos(ang) - y_{O'}\sin(ang) \\ -\sin(ang) & \cos(ang) & x_{O'}\sin(ang) - y_{O'}\cos(ang) \\ 0 & 0 & 1 \end{bmatrix};$$

where, $(x_{O'}, y_{O'})$ is the coordinate of the midpoint of the first identification line of the identification area in the coordinate system of the radar. In addition, in order to further improve the localization accuracy of the robot, assuming that a distance between a center of the robot and the radar is L, the coordinate of the center of the robot in the coordinate system of the charging station can be calculated based on the following equation:

$$\begin{bmatrix} x \\ y \\ 1 \end{bmatrix} = A \begin{bmatrix} -L \\ 0 \\ 1 \end{bmatrix}.$$

In this embodiment, the ] shaped identification area composed of three lines on the horizontal section of the charging identification area is set, the charging interface disposed in the central part of the first identification line, the directional angle of the first identification line is estimated trough the identification points of the radar signals detected by the radar of the robot, and the sequence of the identification points of the identification area is determined based on the directional angle, and then the division point of the sequence of the identification points is further obtained so as to fit the identification points of the divided first identification line to obtain the line equation of the first identification line. The relative position of the robot is determined by employing middle point of the first identification line, so that the robot can be free from the interference of ambient light when localization, which is beneficial to improve the localization accuracy of the robot, thereby improving the accuracy and reliability of the recharging of the robot.

It should be understood that, the sequence of the serial number of the steps in the above-mentioned embodiments does not mean the execution order while the execution order of each process should be determined by its function and internal logic, which should not be taken as any limitation to the implementation process of the embodiments.

FIG. 9 is a schematic block diagram of an embodiment of a robot recharging localization apparatus according to the present disclosure. A localization apparatus for recharging of a mobile robot is provided. The robot is configured to identify a charging identification area, where the identification area is defined by a first identification surface as well as a second identification surface and a third identification surface both extending from the first identification surface in a same direction, the identification area is defined by a charging station having a charging interface, and the first identification surface, the second identification surface and the third identification surface intersect a horizontal section of the identification area on a first identification line, a second identification line and a third identification line, respectively. The apparatus includes:

a directional angle estimating unit 901 configured to calculate a directional angle of the first identification line of the identification area based on identification points collected by a radar of the robot, where the directional angle is an included angle of the first identification line and an axis of a coordinate system of the robot;

an identification point sequence determining unit 902 configured to determine a sequence of the identification points in the identification area according to the directional angle of the first identification line;

a dividing point determining unit 903 configured to determine dividing point(s) in the sequence of the identification points based on a change of a first included angle formed of a radar zero point of the first identification line, endpoints of the sequence of the identification points, and the identification points in the sequence of the identification points;

a fitting unit 904 configured to fit the sequence of the identification points to obtain a linear equation of the first identification line with respect to a coordinate system of the robot; and a relative position determining unit 905 configured to determine a central positional coordinate of the first identification line based on the dividing point(s) and the linear equation, and determining a relative position of the robot based on the central positional coordinate and the linear equation.

The robot recharging localization apparatus shown in FIG. 9 corresponds to the robot recharging localization method shown in FIG. 4.

In this embodiment, each of the above-mentioned modules/units is implemented in the form of software, which can be computer program(s) stored in a memory of the robot recharging localization apparatus and executable on a processor of the robot recharging localization apparatus. In other embodiments, each of the above-mentioned modules/units may be implemented in the form of hardware (e.g., a circuit of the robot recharging localization apparatus which is coupled to the processor of the robot recharging localization apparatus) or a combination of hardware and software (e.g., a circuit with a single chip microcomputer).

FIG. 10 is a schematic block diagram of an embodiment of a robot according to the present disclosure. As shown in FIG. 10, in this embodiment, a mobile robot 1000 such as a patrolling robot is provided. the robot 1000 includes a processor 1100, a storage 1101, and a computer program 1102 stored in the storage 1101 and executable on the processor 1100, for example, a robot recharging localization program, and a radar 1103. When executing (instructions in) the computer program 1102, the processor 1100 implements the steps in the above-mentioned embodiments of the robot recharging localization method. Alternatively, when the processor 1100 executes the (instructions in) computer program 1102, the functions of each module/unit in the above-mentioned device embodiments are implemented. In this embodiment, the radar 1103 is a lidar.

Exemplarily, the computer program 1102 may be divided into one or more modules/units, and the one or more modules/units are stored in the storage 1101 and executed by the processor 1100 to realize the present disclosure. The one or more modules/units may be a series of computer program instruction sections capable of performing a specific function, and the instruction sections are for describing the execution process of the computer program 1102 in the robot 1000. For example, the computer program 1102 can be divided into:

a directional angle estimating unit configured to calculate a directional angle of the first identification line of the identification area based on identification points collected by a radar of the robot, where the directional angle is an included angle of the first identification line and an axis of a coordinate system of the robot;

an identification point sequence determining unit configured to determine a sequence of the identification points in the identification area according to the directional angle of the first identification line;

a dividing point determining unit configured to determine dividing point(s) in the sequence of the identification points based on a change of a first included angle formed of a radar zero point of the first identification line, endpoints of the sequence of the identification points, and the identification points in the sequence of the identification points;

a fitting unit configured to fit the sequence of the identification points to obtain a linear equation of the first identification line with respect to a coordinate system of the robot; and a relative position determining unit configured to determine a central positional coordinate of the first identification line based on the dividing point(s) and the linear equation, and determining a relative position of the robot based on the central positional coordinate and the linear equation.

The robot 1000 may include, but is not limited to, the processor 1100 and the storage 1101. It can be understood by those skilled in the art that FIG. 10 is merely an example of the robot 1000 and does not constitute a limitation on the robot 10000, and may include more or fewer components than those shown in the figure, or a combination of some components or different components. For example, the robot 1000 may further include an input/output device, a network access device, a bus, and the like.

The processor 1100 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 1101 may be an internal storage unit of the robot 110, for example, a hard disk or a memory of the robot 1000. The storage 1101 may also be an external storage device of the robot 1000, for example, a plug-in hard disk, a smart media card (SMC), a secure digital (SD) card, flash card, and the like, which is equipped on the robot 1000. Furthermore, the storage 1101 may further include both an internal storage unit and an external storage device, of the robot 1000. The storage 1101 is configured to store the computer program 1102 and other programs and data required by the robot 1000. The storage 1101 may also be used to temporarily store data that has been or will be output.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware.

Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (or device)/robot and method may be implemented in other manners. For example, the above-mentioned apparatus/robot embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented localization method for recharging of a mobile robot to identify a charging identification area, wherein the identification area is defined by a first identification surface and a second identification surface and a third identification surface both extending from the first identification surface in a same direction, the identification area is provided with a charging station having a charging interface, and the first identification surface, the second identification surface and the third identification surface intersect a section of the identification area on a first identification line, a second identification line and a third identification line, respectively, and the method comprises executing on a processor steps of:

calculating a directional angle of the first identification line based on identification points near a radar zero point of the first identification line collected by a radar of the robot, wherein the radar zero point is a point on the first identification line corresponding to a 0-degree direction of the radar in a coordinate system of the radar during ranging of the radar, wherein the 0-degree direction is a direction in a center of a predetermined scanning range of the radar, and wherein the directional angle is an included angle between the first identification line and an axis of a coordinate system of the robot;

determining a sequence of the identification points in the identification area according to the calculated directional angle of the first identification line, and finding two endpoints of the sequence of the identification points;

determining one or more dividing points in the sequence of the identification points based on a change of a first included angle formed of the radar zero point of the first identification line, endpoints of the sequence of the identification points, and the identification points in the sequence of the identification points;

fitting the sequence of the identification points to obtain a linear equation of the first identification line with respect to the coordinate system of the robot; and determining a central positional coordinate of the first identification line based on the one or more dividing points and the linear equation, and determining a relative position of the robot based on the central positional coordinate and the linear equation.

2. The method of claim 1, wherein the step of calculating the directional angle of the first identification line based on the identification points near the radar zero point of the first identification line collected by the radar of the robot comprises;

fitting the identification points near the radar zero point to form the estimated first identification line, and calculating the directional angle of the first identification line.

3. The method of claim 1, wherein the step of determining the sequence of the identification points in the identification area according to the calculated directional angle of the first identification line, and finding the two endpoints of the sequence of the identification points comprises:

selecting the identification points from the radar zero point along two opposite directions of the estimated first identification line in a sequential manner, and forming a first line from the selected identification points to the radar zero point;

obtaining a directional angle of the first line, determining a difference between the directional angle of the first line and the calculated directional angle of the first identification line; and using a previously selected identification point of the identification point currently selected in the sequential manner as the endpoint of the sequence of the identification points, in response to the difference being greater than a predetermined value, and determining the sequence of the identification points based on the identified endpoint.

4. The method of claim 1, wherein the step of determining the one or more dividing points in the sequence of the identification points based on the change of the first included angle formed of the radar zero point of the first identification line, the endpoints of the sequence of the identification points, and the identification points in the sequence of the identification points comprises:
   forming a first angle with a central identification point between the radar zero point and the endpoint as a vertex based on one of the endpoints in the sequence of the identification points, the radar zero point, and the central identification point; and
   determining the central identification point corresponding to the smallest first angle as the one or more dividing, points.

5. The method of claim 1, wherein the step of determining the central positional coordinate of the first identification line based on the one or more dividing points and the linear equation, and determining the relative position of the robot based on the central positional coordinate and the linear equation comprises:
   determining a coordinate of the midpoint of the first identification line based on the one or more dividing points;
   calculating a second included angle of a coordinate axis of the first identification line with respect to the coordinate system of the radar; and
   converting the position of the robot to the coordinate of a coordinate system of the charging station based on the coordinate of the midpoint and the second included angle.

6. The method of claim 5, wherein the step of converting the position of the robot to the coordinate of the coordinate system of the charging station based on the coordinate of the midpoint and the second included angle comprises:
   converting the position of the robot to the coordinate of the coordinate system of the charging station based on a transformation matrix of:

$$A = \begin{bmatrix} \cos(ang) & \sin(ang) & -x_{O'}\cos(ang) - y_{O'}\sin(ang) \\ -\sin(ang) & \cos(ang) & x_{O'}\sin(ang) - y_{O'}\cos(ang) \\ 0 & 0 & 1 \end{bmatrix};$$

where, ang is the second included angle of the first identification line with respect to a horizontal axis of the coordinate system of the radar, and $(X_{O'}, Y_{O'})$ is the coordinate of the midpoint of the first identification line in the identification area of the coordinate system of the radar.

7. A localization apparatus for recharging of a mobile robot to identify a charging identification area, wherein the identification area is defined by a first identification surface and a second identification surface and a third identification surface both extending from the first identification surface in a same direction, the identification area is provided with a charging station having a charging interface, and the first identification surface, the second identification surface and the third identification surface intersect a section of the charging station on a first identification line, a second identification line and a third identification line, respectively, and the apparatus comprises:
   a directional angle estimating unit configured to calculate a directional angle of the first identification line based on identification points near a radar zero point of the first identification line collected by a radar of the robot, wherein the radar zero point is a point on the first identification line corresponding to a 0-degree direction of the radar in a coordinate system of the radar during ranging of the radar, wherein the 0-degree direction is a direction in a center of a predetermined scanning range of the radar, and wherein the directional angle is an included angle between the first identification line and an axis of a coordinate system of the robot;
   an identification point sequence determining unit configured to determine a sequence of the identification points in the identification area according to the calculated directional angle of the first identification line, and finding two endpoints of the sequence of the identification points;
   a dividing point determining unit configured to determine one or more dividing points in the sequence of the identification points based on a change of a first included angle formed of the radar zero point of the first identification line, endpoints of the sequence of the identification points, and the identification points in the sequence of the identification points;
   a fitting unit configured to fit the sequence of the identification points to obtain a linear equation of the first identification line with respect to the coordinate system of the robot; and
   a relative position determining unit configured to determine a central positional coordinate of the first identification line based on the one or more dividing points and the linear equation, and determining a relative position of the robot based on the central positional coordinate and the linear equation.

8. The apparatus of claim 7, wherein the directional angle estimating unit comprises:
   a directional angle calculation subunit configured to fit the identification points near the radar zero point to form the estimated first identification line, and calculate the directional angle of the first identification line.

9. A robot, comprising:
   a radar;
   a memory;
   a processor; and
   one or more computer programs for recharging of a mobile robot to identify a charging identification area stored in the memory and executable on the processor, wherein the identification area is defined by a first identification surface and a second identification surface and a third identification surface both extending from the first identification surface in a same direction, the identification area is provided with a charging station having a charging interface, and the first identification surface, the second identification surface and the third identification surface intersect a section of the identification area on a first identification line, a second identification line and a third identification line, respectively; wherein the one or more computer programs comprise:
   instructions for calculating a directional angle of the first identification line based on identification points near a radar zero point of the first identification line collected by a radar of the robot, wherein the radar zero point is a point on the first identification line corresponding to a 0-degree direction of the radar in a coordinate system of the radar during ranging of the radar wherein the 0-degree direction is a direction in a center of a predetermined scanning range of the radar, and wherein the directional angle is an included angle between the first identification line and an axis of a coordinate system of the robot;

instructions for determining a sequence of the identification points in the identification area according to the calculated directional angle of the first identification line, and finding two endpoints of the sequence of the identification points;

instructions for determining one or more dividing points in the sequence of the identification points based on a change of a first included angle formed of the radar zero point of the first identification line, endpoints of the sequence of the identification points, and the identification points in the sequence of the identification points;

instructions for fitting the sequence of the identification points to obtain a linear equation of the first identification line with respect to the coordinate system of the robot; and instructions for determining a central positional coordinate of the first identification line based on the one or more dividing points and the linear equation, and determining a relative position of the robot based on the central positional coordinate and the linear equation.

10. The robot of claim 9, wherein the instructions for calculating the directional angle of the first identification line based on identification points near the radar zero point of the first identification line collected by the radar of the robot comprise:

instructions for fitting the identification points near the radar zero point to form the estimated first identification line, and calculating the directional angle of the first identification line.

11. The robot of claim 9, wherein the instructions for determining the sequence of the identification points in the identification area according to the calculated directional angle of the first identification line, and finding the two endpoints of the sequence of the identification points comprise:

instructions for selecting the identification points from the radar zero point along two opposite directions of the estimated first identification line in a sequential manner, and forming a first line from the selected identification points to the radar zero point;

instructions for obtaining a directional angle of the first line, determining a difference between the directional angle of the first line and the calculated directional angle of the first identification line; and instructions for using previously selected identification point of the identification point currently selected in the sequential manner as the endpoint of the sequence of the identification points, in response to the difference being greater than a predetermined value, and determining the sequence of the identification points based on the identified endpoint.

12. The robot of claim 9, wherein the instructions for determining the one or more dividing points in the sequence of the identification points based on the change of the first included angle formed of the radar zero point of the first identification line, the endpoints of the sequence of the identification points, and the identification points in the sequence of the identification points comprise:

instructions for forming a first angle with a central identification point between the radar zero point and the endpoint as a vertex based on one of the endpoints in the sequence of the identification points, the radar zero point, and the central identification point; and instructions for determining the central identification point corresponding to the smallest first angle as the one or more dividing points.

13. The robot of claim 9, wherein the instructions for determining the central positional coordinate of the first identification line based on the one or more dividing points and the linear equation, and determining the relative position of the robot based on the central positional coordinate and the linear equation comprise:

instructions for determining a coordinate of the midpoint of the first identification line based on the one or more dividing points;

instructions for calculating a second included angle of a coordinate axis of the first identification line with respect to the coordinate system of the radar; and instructions for converting the position of the robot to the coordinate of a coordinate system of the charging station based on the coordinate of the midpoint and the second included angle.

14. The robot of claim 13, wherein the instructions for converting the position of the robot to the coordinate of the coordinate system of the charging station based on the coordinate of the midpoint and the second included angle comprise:

instructions for converting the position of the robot to the coordinate of the coordinate system of the charging station based on a transformation matrix of:

$$A = \begin{bmatrix} \cos(ang) & \sin(ang) & -x_{O'}\cos(ang) - y_{O'}\sin(ang) \\ -\sin(ang) & \cos(ang) & x_{O'}\sin(ang) - y_{O'}\cos(ang) \\ 0 & 0 & 1 \end{bmatrix};$$

where, ang is the second included angle of the first identification line with respect to a horizontal axis of the coordinate system of the radar, and $(X_{O'}, y_{O'})$ is the coordinate of the midpoint of the first identification line in the identification area of the coordinate system of the radar.

15. The method of claim 1, wherein the second identification line and the third identification line are respectively have a vertical relationship with respect to the first identification line; or a straight angle between the first identification line, the second identification line and the third identification line is greater than 90 degrees.

16. The method of claim 1, wherein the charging interface is for the robot to charge and is in the identification area, the radar is installed directly in front of the robot, and a polar coordinate system of the radar which has a direction directly in front of the detecting radar as a X-axis and the radar as a center point is created, a position of the radar is not overlap with a center of the robot.

17. The apparatus of claim 7, wherein the identification point sequence determining unit is further configured to:

select the identification points from the radar zero point along two opposite directions of the first identification line in a sequential manner, and form a first line from the selected identification points to the radar zero point;

obtain a directional angle of the first line, determine a difference between the directional angle of the first line and the calculated directional angle of the first identification line; and use a previously selected identification point of the identification point currently selected in the sequential manner as the endpoint of the sequence of the identification points, in response to the difference being greater than a predetermined value, and determine the sequence of the identification points based on the identified endpoint.

18. The apparatus of claim 7, wherein the dividing point determining unit is further configured to:
form a first angle with a central identification point between the radar zero point and the endpoint as a vertex based on one of the endpoints in the sequence of the identification points, the radar zero point, and the central identification point; and
determine the central identification point corresponding to the smallest first angle as the one or more dividing, points.

19. The apparatus of claim 7, wherein the relative position determining unit is further configured to:
determine a coordinate of the midpoint of the first identification line based on the one or more dividing points;
calculate a second included angle of a coordinate axis of the first identification line with respect to the coordinate system of the radar; and
convert the position of the robot to the coordinate of a coordinate system of the charging station based on the coordinate of the midpoint and the second included angle.

20. The apparatus of claim 19, wherein the relative position determining it is further configured to:
convert the position of the robot to the coordinate of the coordinate system of the charging station based on a transformation matrix of:

$$A = \begin{bmatrix} \cos(ang) & \sin(ang) & -x_{O'}\cos(ang) - y_{O'}\sin(ang) \\ -\sin(ang) & \cos(ang) & x_{O'}\sin(ang) - y_{O'}\cos(ang) \\ 0 & 0 & 1 \end{bmatrix};$$

where, ang is the second included angle of the first identification line with respect to a horizontal axis of the coordinate system of the radar, and $(x_{O'}, y_{O'})$ is the coordinate of the midpoint of the first identification lure ire the identification area of the coordinate system of the radar.

* * * * *